United States Patent [19]

Mizokami

[11] Patent Number: 4,492,858
[45] Date of Patent: Jan. 8, 1985

[54] PHOTOMETRIC CIRCUIT HAVING A PLURALITY OF PHOTOELECTRIC TRANSDUCER ELEMENTS CAPABLE OF BEING SELECTIVELY ENABLED FOR PHOTOMETRY

[75] Inventor: Kazunori Mizokami, Hachioji, Japan
[73] Assignee: Olympus Optical Company Ltd., Tokyo, Japan
[21] Appl. No.: 385,778
[22] Filed: Jun. 7, 1982

[30] Foreign Application Priority Data

Sep. 11, 1981 [JP] Japan ................................. 56-144118

[51] Int. Cl.³ ............................................. G03B 7/083
[52] U.S. Cl. ............................ 250/214 P; 250/214 L; 354/425; 354/429; 356/222; 356/223
[58] Field of Search ......................... 250/214 P, 214 L; 354/429, 430, 432, 433, 434, 425; 356/218, 222, 223, 224

[56] References Cited

U.S. PATENT DOCUMENTS 4,027,314  5/1977  Iguchi et al. .................... 354/434
4,096,491  6/1978  Wagensonner et al. ......... 354/434
4,166,680  9/1979  Maitani .......................... 354/126

OTHER PUBLICATIONS

Japanese Laid Open Patent Publication No. Sho5-4-43727, filed 13 Sep. 1977; inventor-Kobori et al.; Appln. No. Sho52-110780.
Japanese Laid Open Patent Publication No. Sho5-3-36229, filed 16 Sep. 1976; inventor-Miyata et al.; Appln. No. Sho51-111-46.

Primary Examiner—Edward P. Westin
Attorney, Agent, or Firm—Louis Weinstein

[57] ABSTRACT

A photometric circuit comprises an operational amplifier including a plurality of differential amplifiers, a constant current bias circuit for supplying a constant current bias to the differential amplifiers, and a bias control switching circuit which selectively connects the constant current bias circuit to one of the plurality of differential amplifiers in response to an external signal. A plurality of photoelectric transducer elements, used for purpose of photometry, are connected to differential inputs corresponding to the plurality of differential amplifiers, and the transducer element is selectively enabled for photometry in accordance with the external signal.

10 Claims, 5 Drawing Figures

F I G. 4
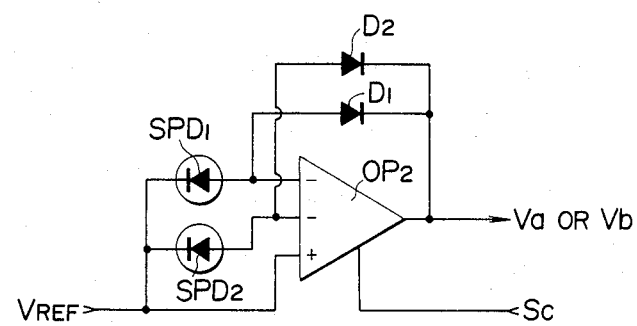
F I G. 5
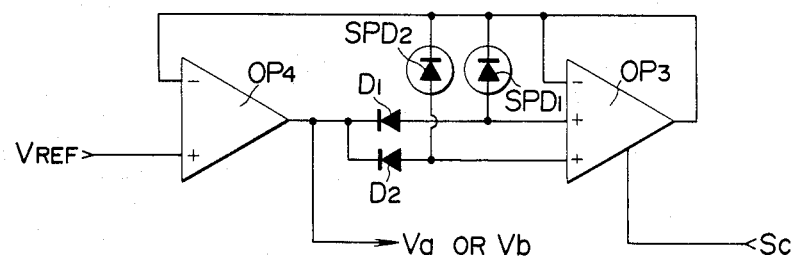

PHOTOMETRIC CIRCUIT HAVING A PLURALITY OF PHOTOELECTRIC TRANSDUCER ELEMENTS CAPABLE OF BEING SELECTIVELY ENABLED FOR PHOTOMETRY

BACKGROUND OF THE INVENTION

The invention relates to a photometric circuit, and more particularly, to a photometric circuit including a single operational amplifier which is adapted to produce a photometric output selectively in response to outputs from a plurality of photoelectric transducer elements which are provided for the purpose of photometry.

As is well recognized, the photometry may utilize a plurality of photoelectric transducer elements having different photometry responses such as those directed to a spotwise photometry and those directed to an average photometry. Alternatively, the photometry may utilize a plurality of photoelectric transducer elements disposed in different photometric optics, such as those used for a TTL (through-the-lens) open photometry and those directed to a TTL film surface reflection photometry. It may be desired to select one of these photoelectric transducer elements for connection with an associated amplifier in order to produce an photometric output in accordance with the response of this particular transducer element. In such instance, there may be provided means for providing a switching among the plurality of photoelectric transducer elements, or means may be provided which switches from one output to another. The transducer element switching means is illustrated in FIG. 1 where it will be noted that a plurality of photoelectric transducer elements SPD1, SPD2 (two in number) are connected to a single amplifier AMP1 through a changeover switch SW1. Depending on the position assumed by the switch SW1, a photometric output may be produced selectively from either the transducer element SPD1 or SPD2. Output switching means is illustrated in FIG. 2 where it will be noted that each of the transducer elements SPD1, SPD2 is connected to an associated amplifier AMP2, AMP3, respectively, while a changeover switch SW2 is connected to the individual outputs of the amplifiers so that a photometric output from either amplifier may be selectively produced depending on the position of the switch SW2.

It will be noted that in the arrangement of FIG. 1, a switching operation takes place on the input side of the amplifier AMP1 having a very high impedance. Accordingly, a high reliability as well as a high contact efficiency is required of the changeover switch SW1, causing an increased cost thereof. In addition, the arrangement is vulnerable to noise applied to the switch, leakage current or poor contact thereof. The arrangement shown in FIG. 2 requires a separate amplifier for each of the transducer elements, and hence the photometric circuit becomes bulky and complicated. In addition, it is difficult to achieve a balance between the responses of the individual amplifiers. If an imbalance is allowed to remain, there results an imbalance in the photometry response.

SUMMARY OF THE INVENTION

In view of the foregoing, it is an object of the invention to provide a photometric circuit comprising a photometry operational amplifier including a plurality of differential amplifiers and which is associated with a constant current bias circuit which is switched by an external signal to allow a photometric output to be produced selectively from each of the photoelectric transducer elements.

In accordance with the invention, an external signal switches the constant current bias circuit associated with the operational amplifier to choose a particular transducer element, the output of which is utilized. This permits a switching operation to be performed with a digital signal of a reduced impedance, eliminating the difficulties associated with noises, leakage currents or poor contact.

Moreover, the operational amplifier is formed in a monolithic form, which allows the responses of the individual differential amplifiers to be easily matched with a high accuracy.

BRIEF DESCRIPTION OF THE DRAWINGS

FIG. 4 is a circuit diagram of a photometric circuit according to another embodiment of the invention; and FIG. 5 is a circuit diagram of a photometric circuit according to a further embodiment of the invention.

DESCRIPTION OF PREFERRED EMBODIMENTS

Figure 1:
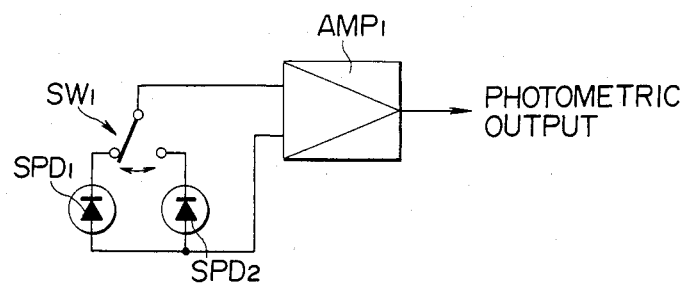
FIGS. 1 and 2 are circuit diagrams of switching means used in conventional photometric arrangements.
Figure 2:
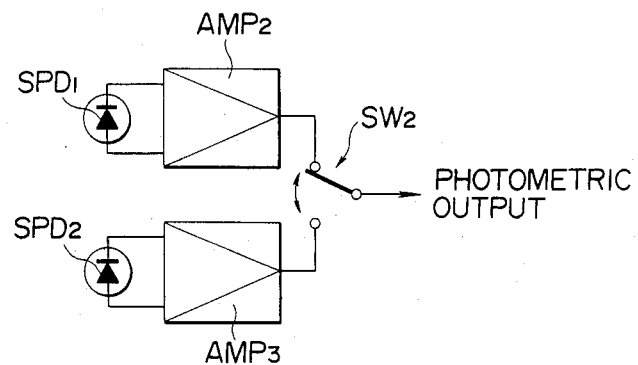
Figure 3:
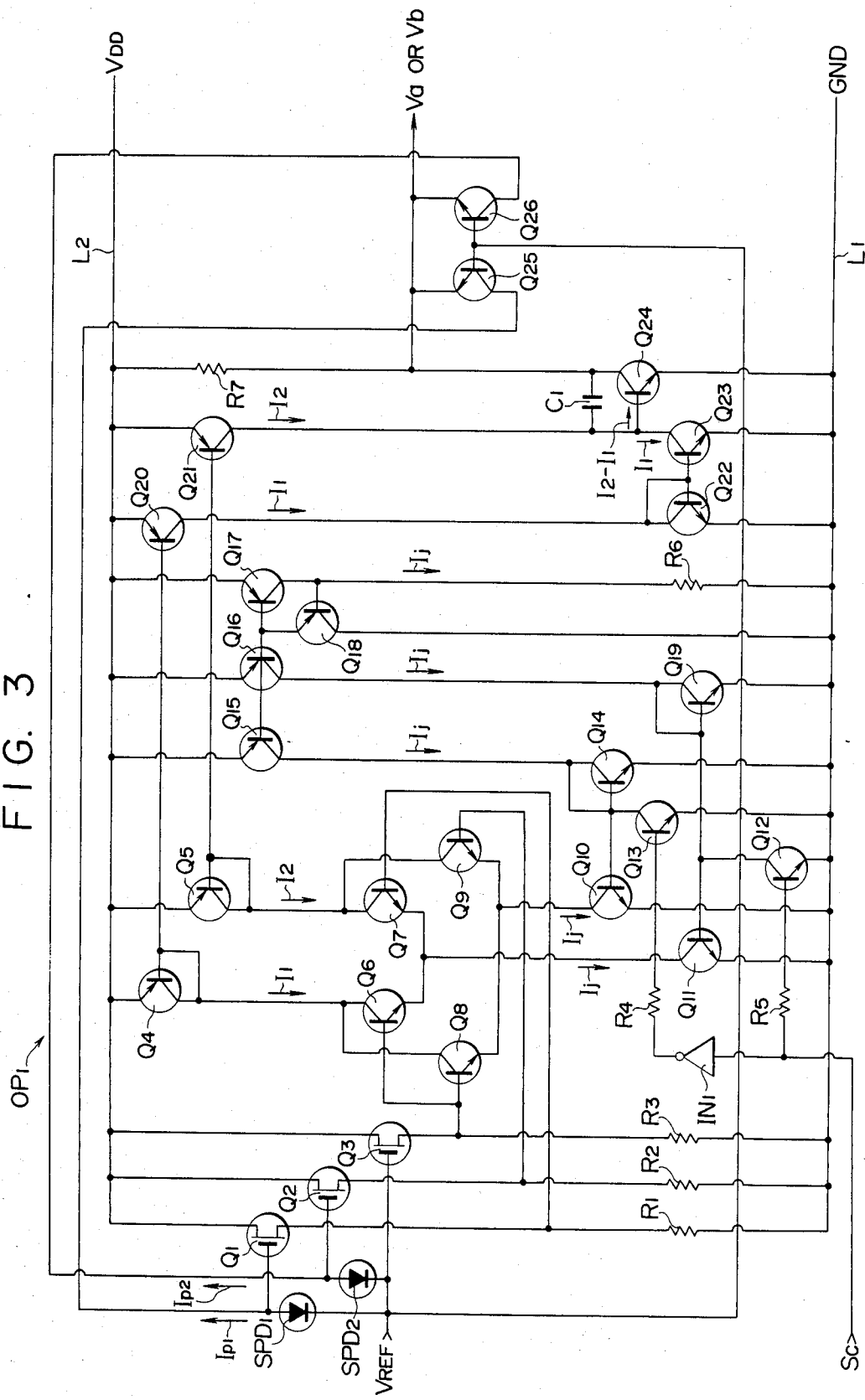
FIG. 3 is a circuit diagram of a photometric circuit according to one embodiment of the invention.

Referring to FIG. 3, there is shown a photometric circuit according to one embodiment of the invention. The photometric circuit essentially comprises a pair of photoelectric transducer elements SPD1, SPD2, such as silicon photodiodes, which are used for the purpose of photometry, and connected to an operational amplifier OP1 formed by a monolithic integrated circuit chip, which represents the entire circuit other than the transducer elements SPD1, SPD2. The transducer elements SPD1, SPD2 have their cathodes connected in common to the base of a third MOS field effect transistor Q3, which represents a non-inverting input terminal of the operational amplifier OP1 and to which a reference voltage $V_{REF}$ is applied. The anode of transducer element SPD1 is connected to the base of a first MOS field effect transistor Q1, which represents one of the inverting input terminals of the operational amplifier OP1, and the anode of transducer element SPD2 is connected to the base of a second MOS field effect transistor Q2, which represents the other inverting input terminal of the operational amplifier OP1.

The three field effect transistors Q1 to Q3 have their sources connected to a bus L1 of a ground potential GND through resistors R1 to R3, respectively, while their drains are connected to a bus L2 which supplies an operating voltage $V_{DD}$. The source of the first field effect transistor Q1 is connected to the base of a transistor Q7, which forms one of the differential amplifiers of the operational amplifier OP1 together with another transistor Q6. The source of the second field effect transistor Q2 is connected to the base of a transistor Q9, which forms the other differential amplifier of the operational amplifier OP1 together with a transistor Q8. The source of the third field effect transistor Q3 is connected to the base of the transistor Q6 and also to the base of the transistor Q8, both of which form part of differential amplifiers.

The transistors Q6, Q7 are NPN transistors, and the collector of the transistor Q6 is connected to the collector and the base of a transistor Q4, which forms a current mirror circuit together with a transistor Q20. The collector of the transistor Q7 is connected to the collector and the base of a transistor Q5, which forms another current mirror circuit together with a transistor Q21. The transistors Q6, Q7 have their emitters connected in common and connected to the collector of a transistor Q11. The transistors Q8, Q9 are NPN transistors, and the collector of the transistor Q8 is connected to the collector and the base of the transistor Q4 while the collector of the transistor Q9 is connected to the collector and the base of the transistor Q5. The transistors Q8, Q9 have their emitters connected in common and connected to the collector of a transistor Q10.

The transistors Q10, Q11 are NPN transistors, and the emitter of the transistor Q10 is connected to the bus L1 and the base thereof is connected to the base and the collector of a transistor Q14, which forms a further current mirror circuit together with the transistor Q10. The base of the transistor Q10 is also connected to the collector of an NPN switching transistor Q13 which is provided for the purpose of bias control. The switching transistor Q13 has its emitter connected to the bus L1, and its base connected through resistor R4 to the output of an inverter IN1, the input of which is connected to a control signal input terminal (not shown) of the operational amplifier OP1 so as to receive a bias switching control signal Sc. Transistor Q11 has its emitter connected to the bus L1 and has its base connected to the base and the collector of a transistor Q19, which forms an additional current mirror circuit together with the transistor Q11. The base of the transistor Q11 is also connected to the collector of an NPN switching transistor Q12 which is also provided for bias control purposes. The switching transistor Q12 has its emitter connected to the bus L1 and its base connected through resistor R5 to receive the bias switching control signal Sc.

The transistors Q14 and Q19 are NPN transistors and have their emitters connected to the bus L1 and have their collectors connected to the collectors of transistors Q15 and Q16, respectively. The transistors Q15, Q16 are both PNP transistors and have their emitters connected to the bus L2 and have their bases connected in common and connected to the base of a lateral PNP transistor Q17, which forms a constant current circuit together with resistor R6. The transistor Q17 has its emitter connected to the bus L2, and its collector connected to the bus L1 through resistor R6. The base and the collector of the transistor Q17 are connected to the emitter and the base, respectively, of a substrate PNP transistor Q18 which is effective to provide compensation of a current amplification factor $h_{FE}$ of the transistor Q17. The collector of the transistor Q18 is connected to the bus L1. The purpose of the transistor Q18 is to supply a base current to the transistors Q15, Q16, Q17 which base current is its emitter current, and to implement a current mirror circuit of high accuracy.

The transistors Q4, Q5 are both PNP transistors and have their emitters connected to the bus L2. Their bases are connected to the bases of transistors Q20 and Q21, respectively, which are in turn PNP transistors and have their emitters connected to the bus L2. The collector of the transistor Q20 is connected to the collector and the base of a transistor Q22 while the collector of the transistor Q21 is connected to the collector of a transistor Q23 and to the base of a transistor Q24. The transistors Q22, Q23, which are both of NPN type, have their bases connected in common to form a current mirror circuit, with their emitters connected to the bus L1. The collector of the transistor Q24, which is of NPN type, is connected to the bus L2 through resistor R7 and is also connected to the base thereof through a phase compensating capacitor C1 which serves to prevent oscillation. The emitter of the transistor Q24 is connected to the bus L1.

The collector of the transistor Q24 represents an output terminal of the operational amplifier OP1, and is connected to the emitters of logarithmic compression transistors Q25, Q26, which are NPN transistors and which have their bases connected in common and connected to the base of the third field effect transistor Q3 so as to be fed with the reference voltage $V_{REF}$. The collectors of the transistors Q25, Q26 are connected to the anodes of the transducer elements SPD1, SPD2, respectively.

In operation, the photometric circuit is arranged so that either transducer element SPD1 or SPD2 is enabled for photometric operation in accordance with the magnitude of the bias switching control signal Sc applied to the control signal input of the operational amplifier OP1. Accordingly, the operation will be described when the control signal Sc has a low level (hereafter abbreviated as 'L' level) and a high level (hereafter as 'H' level).

(a) When the bias switching control signal Sc has an 'L' level:

In this instance, the signal Sc turns the transistor Q12 off, and is inverted by the inverter IN1 to turn the transistor Q13 on. As a result, the bias applied to the transistors Q14, Q10 is reduced to zero, whereby they are turned off. The second differential amplifier formed by the transistors Q8, Q9 is no longer supplied with the constant current bias, and hence is disabled. Accordingly the field effect transistor Q2 having its source connected to the base of the transistor Q9 is disconnected from a following circuit portion. This means that the transducer element SPD2 having its anode connected to the base of the transistor Q2 is disconnected from the operational amplifier OP1 and hence makes no contribution to the operation thereof. As the transistor Q12 is turned off, the transistors Q19, Q11 are turned on, whereby the current mirror effect between the combination of transistors Q17 and Q16 and the combination of transistors Q19 and Q11 permits a constant current Ij which is equal to a current Ij passing through the constant current circuit formed by the transistor Q17 and resistor R6 to flow through the transistor Q11. Accordingly, the first differential amplifier formed by the transistors Q6, Q7 is enabled for operation as a result of a constant current bias supplied thereto. The field effect transistors Q3, Q1 having their sources respectively connected to the bases of transistors Q6, Q7 are then connected with the following circuit portion, whereby the transducer element SPD1 connected across the gates of the transistors Q3, Q1 contributes to the operation of the operational amplifier OP1. Thus, the transducer element SPD1 is enabled for photometry.

When the transducer element SPD1 is thus enabled for photometry, there occurs a flow of drain current through the field effect transistors Q1, Q3 in accordance with gate voltage thereof, thereby varying the source potentials which are developed by the resistors R1, R3. These potentials are applied to the bases of the transistors Q6, Q7. Thus, the transistors Q6, Q7 produce collector currents I1, I2 which correspond to these base potentials. The sum of the collector currents I1 and I2 is equal to the current Ij, which passes through the transistor Q11. Thus, $Ij = I1 + I2$. Since the responses of the transistors Q6, Q7 are matched, when the base potentials of the transistors Q6, Q7 are equal to each other, there results that $I1 = I2 = Ij/2$. The collector currents I1, I2 flow through the load transistors Q4, Q5, and the current mirror effect occurring between the combination of transistors Q4, Q20 and Q5, Q21 produce collector currents I1, I2 through the transistors Q20, Q21, respectively. The collector current I1 of the transistor Q20 flows through the load transistor Q22, and the current mirror effect of the transistors Q22, Q23 produces a flow of current I1 through the collector of the transistor Q23. Accordingly, the difference I2−I1 between the collector current I2 of the transistor Q21 and the collector current I1 of the transistor Q23 finds its way into the base of the transistor Q24, producing a collector current which depends on the magnitude of said difference.

On the other hand, a photocurrent Ip1 passes through the logarithmic compression transistor Q25 into the collector of the output transistor Q24 of the operational amplifier OP1. Since the reference voltage $V_{REF}$ is applied to the base of the third field effect transistor Q3 which represents the non-inverting input terminal of the operational amplifier OP1, the operational amplifier OP1 produces an output voltage Va at the collector of the transistor Q24 which acts through the negative feedback loop formed by the logarithmic compression transistor Q25 to render the base potential of the first field effect transistor Q1, representing one of inverting inputs, equal to the reference voltage $V_{REF}$. In other words, the operational amplifier OP1 produces an output voltage Va which achieves an imaginary short-circuiting across the non-inverting and inverting input terminal through the negative feedback loop. It should be understood that a balanced condition is reached by controlling the output voltage Va in accordance with the difference current I2−I1.

A forward voltage $V_F$ across the PN junction defined between the base and the emitter of the transistor Q25 is given as follows:

$$Ip1 + Is(e^{qV_F/kT} - 1) \quad (1)$$

the output voltage Va is given as follows:

$$Va = V_{REF} - V_F \quad (2)$$

$$= V_{REF} - \frac{kT}{q} \ln(Ip1/Is + 1)$$

where Is represents an inverse saturation current, q a unit charge, k Boltzmann's constant, and T absolute temperature, respectively.

On the other hand, the other transducer element SPD2 also produces a photocurrent Ip2 in accordance with the amount of light impinging thereon, which passes through the logarithmic compression transistor Q26 into the collector of the transistor Q24. However, the operational amplifier OP1 presents an output impedance of substantially zero, and hence the photocurrent Ip2 has little influence upon the output voltage Va of the operational amplifier OP1, in the same manner as other extraneous current has no influence thereupon.

(b) When the bias switching control signal Sc has 'H' level:

In this instance, the signal Sc turns the transistor Q12 on, and is inverted by the inverter IN1 to turn the transistor Q13 off. As the transistor Q12 is turned on, the transistors Q19, Q11 are turned off, whereby the first differential amplifier formed by the transistors Q6, Q7 is no longer supplied with the constant current bias and hence is disabled. Accordingly, the field effect transistor Q1 having its source connected to the base of the transistor Q7 is disconnected from a following circuit portion, and thus the transducer element SPD1 having its anode connected to the base of the transistor Q1 is disconnected from the operational amplifier OP1, presenting no contribution to the operation thereof. On the other hand, as the transistor Q13 is turned off, the transistors Q14, Q10 are turned on, and the current mirror effect between the combination of transistors Q17, Q15 and the combination of transistors Q14, Q10 permits a flow of constant current Ij through the transistor Q10. Accordingly, the second differential amplifier formed by the transistors Q8, Q9 is supplied with the constant current bias and is enabled for operation. In this manner, the field effect transistors Q3, Q2 having their sources respectively connected to the bases of the transistors Q8, Q9 are connected to a subsequent circuit portion, and thus the transducer element SPD2 connected across the gates of the transistors Q3, Q2 contributes to the operation of the operational amplifier OP1. In other words, the transducer element SPD2 is enabled for photometry.

Thus, when the bias switching control signal Sc assumes its 'H' level, the particular differential amplifier which is supplied with the constant current bias is changed from the first to the second differential amplifier, and the particular transducer element which is enabled for photometry is changed from the first to the second transducer element. Subsequently, the operational amplifier OP1 operates in a similar manner as before to produce an output voltage Vb at the collector of the transistor Q24 or the output terminal thereof which acts through the negative feedback loop formed by the logarithmic compression transistor Q26 to produce an imaginary short-circuiting across the base of the field effect transistor Q2, representing the inverting input terminal, and the base of the field effect transistor Q3 which represents the non-inverting input terminal. In a similar form as indicated above, the output voltage Vb is given as follows:

$$Vb = V_{REF} - (kT/q)\ln(Ip2/Is + 1) \quad (3)$$

FIG. 4 shows another embodiment of the invention. The photometric circuit of this embodiment comprises an operational amplifier OP2 which is provided in an integrated circuit form without the formation of the logarithmic compression transistors, with logarithmic compression diodes D1, D2 being externally provided to form a feedback path, in contradistinction to the arrangement of FIG. 3 in which the operational amplifier OP1 inclusive of the logarithmic compression transistors Q25, Q26 is formed in a single chip monolithic integrated circuit form. It should be apparent that this embodiment operates in a similar manner and achieves a similar effect as the first embodiment.

FIG. 5 shows a further embodiment of the invention. In this instance, the photometric circuit comprises an operational amplifier OP3 including a pair of differential amplifiers and a corresponding pair of non-inverting input terminals, and an operational amplifier OP4 of a usual form. Photoelectric transducer elements SPD1, SPD2 are connected to respective differential inputs of the operational amplifier OP3 which is connected in a voltage follower configuration, with its output connected to the inverting input terminal of the operational amplifier OP4 having the reference voltage $V_{REF}$ applied to its non-inverting input terminal. In addition, logarithmic compression diodes D1, D2 are connected between the output of the operational amplifier OP4 and the non-inverting input terminals of the operational amplifier OP3 to form a feedback circuit.

Again, a change in the level of the bias switching control signal Sc permits the transducer elements SPD1, SPD2 to be selectively enabled for photometry, and an output voltage Va or Vb as represented by the equations (2) or (3) is derived as a photometric output at the output of the operational amplifier OP4.

In the described embodiments, a pair of differential amplifiers and a pair of photoelectric transducer elements have been used, but it should be understood that more than two differential amplifiers and transducer elements may be provided.

What is claimed is:

1. A photometic circuit having a plurality of photoelectric transducer elements each capable of being selectively enabled for photometry, comprising:

a first operational amplifier including a plurality of differential amplifiers, each differential amplifier having a pair of input terminals and an output terminal, the pairs of input terminals of each of said differential amplifiers respectively defining a set of inverting and non-inverting input terminals of the operational amplifier and the output terminals of said differential amplifiers being coupled in common and defining the output of the operational amplifier;

a constant current bias circit for selectively supplying one of said differential amplifiers with a constant bias current, and a bias control switching circuit which selectively connects the constant bias current circuit to the differential amplifier selected by the bias control switching circuit in response to an external control signal applied at a control input of the operational amplifier; and each of said photoelectric transducer elements being respectively connected across a pair of input terminals of each of said differential amplifiers.

2. A photometric circuit according to claim 1 in which the operational amplifier includes a plurality of logarithmic compression transistors each having collector, base and emitter terminals, each emitter terminal being connected to the output of the operational amplifier, each collector terminal being connected to an associated inverting input terminal and each base terminal being connected to an associated non-inverting input terminal, for generating a logarithmically compressed photometric output at the output of the operational amplifier.

3. A photometric circuit according to claim 1 wherein each differential amplifier has first and second output terminals;

a current mirror circuit coupled to each output terminal for generating a mirror current equal to the current in the output terminal coupled thereto;

means responsive to the difference between the mirror currents of the operative differential amplifier for developing a voltage representative of a photometric output.

4. A photometric circuit according to claim 1 wherein the current bias circuit comprises a plurality of current mirror circuits each coupled to one of the differential amplifiers for providing its associated differential amplifier with a predetermined bias current;

said bias control switching circuit activating the current mirror circuit of the differential amplifier selected by said external control signal.

5. A photometric circuit according to claim 1 in which a plurality of logarithmic compression diodes are respectively connected between each one of the inverting input termnals and the output terminal of the operational amplifier, whereby a logarithmically compressed photometric output is derived at the output of the operational amplifier.

6. A photometric circuit according to claim 1 in which the input terminals of the differential amplifiers defining non-inverting input terminals of the operational amplifier are coupled in common to define a common non-inverting input terminal.

7. A photometric circuit according to claim 1 further comprising current mirror circuits respectively coupled between the outputs of the differential amplifiers and the output of the operational amplifier and being responsive to the operative differential amplifier for generating mirror currents equal in magnitude to the currents generated by the operative differential amplifier; and means responsive to the difference between said mirror currents for developing a voltage representative of a photometric output at the output of the operational amplifier.

8. A photometric circuit according to claim 7 further comprising logarithmic compression means coupled between the output of said operational amplifier and said photoelectric transducer elements and responsive to said photometric output for creating an effective short circuit condition across the operative photoelectric transducer element.

9. A photometric circuit according to claim 1 in which the input terminals of the differential amplifiers defining inverting input terminals of the operational amplifier are coupled in common to define a common inverting input terminal.

10. A photometric circuit according to claim 9 comprising a second operational amplifier, having inverting and non-inverting input terminals and an output, in which the first operational amplifier is connected in a voltage follower configuration and has its output connected to the inverting input terminal of said second operational amplifier, the second operational amplifier having its output connected to each of the non-inverting input terminals of the first operational amplifier through a logarithmic compression diode, thereby allowing a logarithmically compressed photometric output to be derived at the output terminal of said second operational amplifier.

* * * * *

UNITED STATES PATENT AND TRADEMARK OFFICE
CERTIFICATE OF CORRECTION

PATENT NO. : 4,492,858

DATED : Jan. 8, 1985

INVENTOR(S) : Kazunori Mizokami

It is certified that error appears in the above-identified patent and that said Letters Patent is hereby corrected as shown below:

Column 5, line 47 change "Ipl +" to --Ipl =--

Signed and Sealed this

Seventh Day of May 1985

[SEAL]

Attest:

DONALD J. QUIGG

Attesting Officer     Acting Commissioner of Patents and Trademarks